(12) United States Patent
Amano et al.

(10) Patent No.: US 11,980,926 B2
(45) Date of Patent: May 14, 2024

(54) OPTICAL SAFETY DEVICE, PRESS BRAKE, AND WORKPIECE DETECTION METHOD

(71) Applicant: AMADA CO., LTD., Kanagawa (JP)

(72) Inventors: Kanehide Amano, Kanagawa (JP); Hideki Sasaki, Kanagawa (JP); Takayuki Aoki, Kanagawa (JP); Taichi Suzuki, Kanagawa (JP); Humitaka Ohashi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 472 days.

(21) Appl. No.: 17/417,142

(22) PCT Filed: Dec. 16, 2019

(86) PCT No.: PCT/JP2019/049092
§ 371 (c)(1),
(2) Date: Jun. 22, 2021

(87) PCT Pub. No.: WO2020/137644
PCT Pub. Date: Jul. 2, 2020

(65) Prior Publication Data
US 2022/0062966 A1    Mar. 3, 2022

(30) Foreign Application Priority Data
Dec. 25, 2018   (JP) ................. 2018-240502

(51) Int. Cl.
*B21D 5/02*   (2006.01)
*B21D 55/00*  (2006.01)
*G01V 8/12*   (2006.01)

(52) U.S. Cl.
CPC .......... *B21D 5/0209* (2013.01); *B21D 55/00* (2013.01); *G01V 8/12* (2013.01)

(58) Field of Classification Search
CPC ........ B21D 5/02; B21D 5/0209; B21D 5/004; B21D 55/00; F16P 3/144
See application file for complete search history.

(56) References Cited

U.S. PATENT DOCUMENTS 4,772,801 A     9/1988  Fornerod
6,903,327 B1 *  6/2005  Appleyard ............. B21D 55/00
                                                    250/221

FOREIGN PATENT DOCUMENTS

EP   1914019 A1    4/2008
JP   S62-188906 A  8/1987
(Continued)

OTHER PUBLICATIONS

International Search Report for corresponding Application No. PCT/JP2019/049092, mailed Mar. 3, 2020.
(Continued)

*Primary Examiner* — Debra M Sullivan
(74) *Attorney, Agent, or Firm* — Renner, Otto, Boisselle & Sklar, LLP

(57) ABSTRACT

A received beam amount acquisition section 60 acquires a received beam amount per unit time of a beam receiver 52 at certain sampling time intervals. A beam shielding detection section 66 detects presence or absence of beam shielding of a monitoring beam B by determining whether or not the acquired received beam amount per unit time of the beam receiver is lower than a determination threshold Th for detecting the presence of beam shielding of the monitoring beam B. A detection sensitivity of the beam shielding detection section 66 is configured to be switched from a normal sensitivity mode to a high sensitivity mode when bending is initial processing based on a predetermined processing program, and an acquired height position of the beam receiver 52 is lower than a predetermined second height position LP2.

8 Claims, 10 Drawing Sheets

(56) References Cited

FOREIGN PATENT DOCUMENTS

| JP | 2008-543586 | A | | 12/2008 | | |
|----|----|----|----|----|----|----|
| JP | 2016-128180 | A | | 7/2016 | | |
| JP | 2018-051603 | A | | 4/2018 | | |
| WO | WO-9725568 | A1 | * | 7/1997 | ............... | B21D 5/02 |
| WO | 2006135961 | A1 | | 12/2006 | | |
| WO | WO-2019181815 | A1 | * | 9/2019 | | |

OTHER PUBLICATIONS

Written Opinion for corresponding Application No. PCT/JP2019/049092, mailed Mar. 3, 2020.

\* cited by examiner (a)

(b)

(a)

(b)

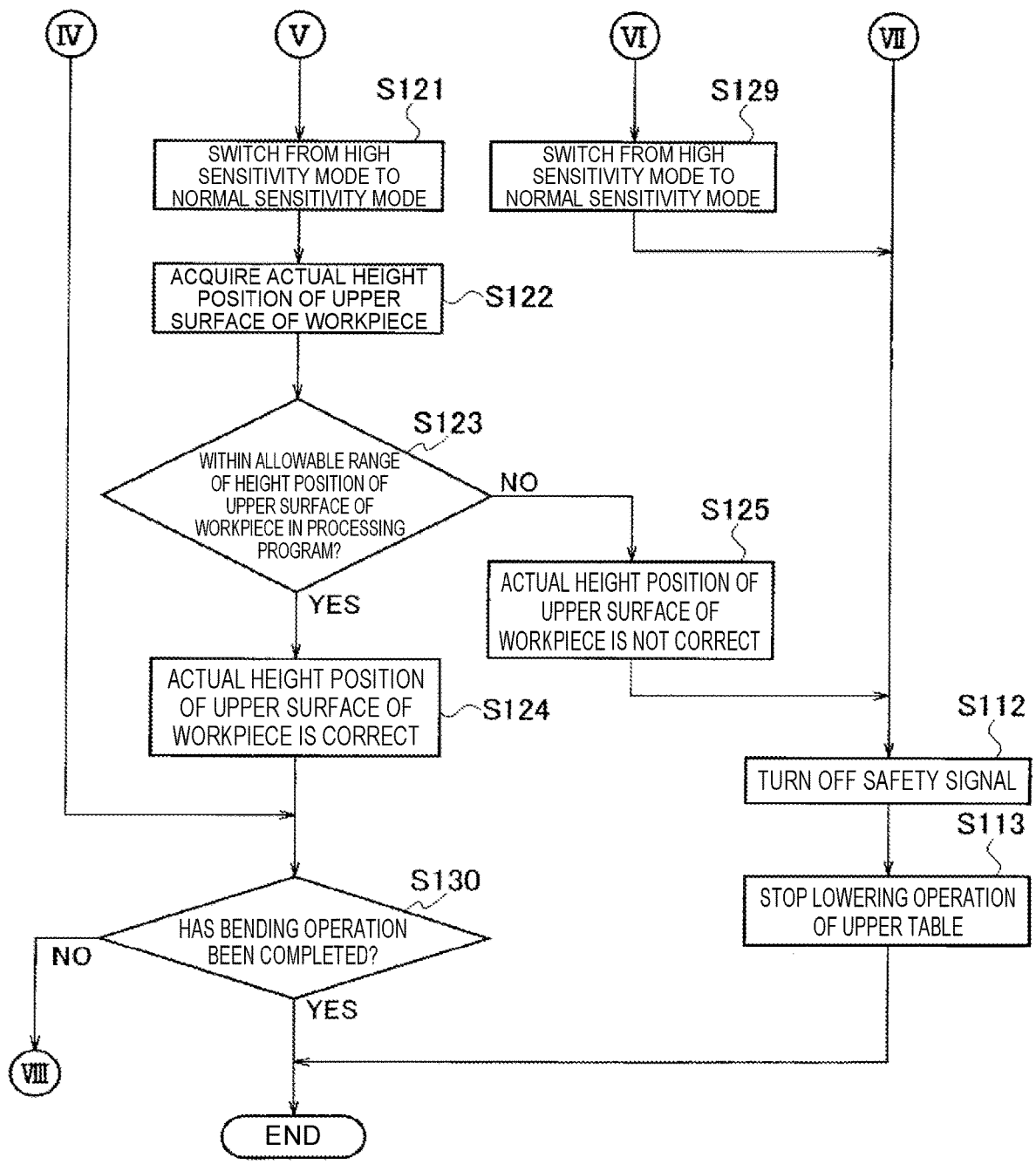

OPTICAL SAFETY DEVICE, PRESS BRAKE, AND WORKPIECE DETECTION METHOD

TECHNICAL FIELD

The present invention relates to an optical safety device for monitoring entry of foreign matter between an upper tool and a lower tool in a press brake, the press brake, and a workpiece detection method.

BACKGROUND ART

In recent years, a press brake has been often equipped with an optical safety device to sufficiently secure the safety of a bending operation of a plate-shaped workpiece (a sheet metal). A related technique is exemplified in Japanese Patent Laid-Open No. 2016-128180 (Patent Literature 1). The configuration and the like of the optical safety device will be briefly described hereinafter.

On one side in a length direction of an upper table of a press brake, there is provided a beam projector that projects a monitoring beam passing through an area and surroundings immediately below an upper tool toward another side in the length direction of the upper table. A beam receiver for receiving the monitoring beam is provided on the other side in the length direction of the upper table, and the beam receiver has a beam receiving element that outputs a beam receiving voltage (a voltage signal) corresponding to a received beam amount of the monitoring beam. In addition, the optical safety device is provided with a monitoring controller for monitoring entry of foreign matter between the upper tool and a lower tool, and the beam projector and the beam receiver are connected to the monitoring controller. The monitoring controller acquires the received beam amount (the beam receiving voltage) of the beam receiver at certain sampling time intervals. The monitoring controller detects presence or absence of beam shielding of the monitoring beam by determining whether or not the acquired received beam amount of the beam receiver is lower than a determination threshold for detecting the presence of beam shielding of the monitoring beam.

When performing initial processing based on a predetermined processing program, the monitoring controller may use the optical safety device to detect presence or absence of a workpiece on the lower tool and to determine correctness of an actual height position of an upper surface of the workpiece in the following manner.

The monitoring controller detects the presence or absence of beam shielding and detects the presence or absence of the workpiece by determining whether or not the acquired received beam amount of the beam receiving element of the beam receiver has been lower than the determination threshold after the height position of the beam receiver became lower than a predetermined height position. The predetermined height position is a position immediately above the height position of the upper surface of the workpiece set in the predetermined processing program (hereinafter, appropriately referred to as a height position of the upper surface of the workpiece in the processing program). In addition, when the presence of beam shielding of the monitoring beam is detected, the monitoring controller detects the presence of the workpiece on the lower tool. Then, the monitoring controller acquires the actual height position of the upper surface of the workpiece based on the height position of the beam receiver at the time of detecting the presence of the workpiece on the lower tool. The monitoring controller determines whether or not the acquired actual height position of the upper surface of the workpiece is correct as compared with the height position of the upper surface of the workpiece in the processing program.

On the other hand, when the absence of beam shielding of the monitoring beam is detected, the monitoring controller detects the absence of the workpiece on the lower tool under condition of the height position of the beam receiver being lower than a predetermined other height position. The predetermined other height position is a position immediately below the height position of the upper surface of the workpiece in the processing program.

SUMMARY OF INVENTION

Technical Problem

As shown in FIG. 1(a), when a thickness (a sheet thickness) of a workpiece W is significantly thin and a V width of a lower tool DM is large, even if a monitoring beam passing through an area and surroundings immediately below an upper tool UM is shielded by the workpiece W, the amount of decrease in a received beam amount (a beam receiving voltage) of a beam receiving element Rxa of a beam receiver RX is small due to leakage of a scattered beam to a side surface and the like of the lower tool DM. As a result, it is not possible to detect presence or absence of beam shielding of the monitoring beam. For this reason, as shown in FIG. 1(b), before performing initial processing based on a predetermined processing program, a magnet sheet MS is attached on a side surface of the lower tool DM while positioning an upper end of the magnet sheet MS at the same height position as an upper surface of the lower tool DM. This gives a virtual thickness to the workpiece W, thereby making it possible to reliably detect the presence or absence of beam shielding of the monitoring beam. Note that FIGS. 1(a) and 1(b) are schematic diagrams for describing the problem of the present invention. In the drawings, "FF" indicates a forward direction, "FR" indicates a rear direction, "L" indicates a left direction, "R" indicates a right direction, "U" indicates an upward direction, and "D" indicates a downward direction.

However, if the process of attaching the magnet sheet MS on the side surface of the lower tool DM is added each time the processing program changes, in other words, a product shape changes, the bending operation becomes complicated. As a result, it becomes difficult to improve efficiency in the bending operation.

Solution to Problem

According to the present invention, it is possible to provide an optical safety device or the like that can reliably detect presence or absence of a workpiece on a lower tool without using a magnet sheet even if the thickness of a workpiece is significantly thin.

An optical safety device according to a technical aspect of the present invention includes a beam projector provided on one side in a length direction of an upper table of a press brake and configured to project a monitoring beam passing through an area and surroundings immediately below an upper tool toward another side in the length direction of the upper table, a beam receiver provided on the other side in the length direction of the upper table and configured to receive the monitoring beam, a received beam amount acquisition section configured to acquire a received beam amount of the beam receiver at certain sampling time intervals, and a beam shielding detection section configured to detect presence or absence of beam shielding of the monitoring beam by determining whether or not the acquired received beam amount of the beam receiver is lower than a determination threshold for detecting the presence of beam shielding of the monitoring beam. A detection sensitivity of the beam shielding detection section is configured to be switched from a normal sensitivity mode to a high sensitivity mode when bending by the press brake is initial processing based on a predetermined processing program, and a height position of the beam receiver is lower than a predetermined height position that is a position immediately above a height position of an upper surface of a workpiece set in the predetermined processing program.

A workpiece detection method according to another technical aspect of the present invention, includes acquiring a received beam amount of a beam receiver at certain sampling time intervals in a state in which a beam projector provided on one side in a length direction of an upper table of a press brake projects a monitoring beam passing through an area and surroundings immediately below an upper tool toward another side in the length direction of the upper table, and the beam receiver provided on the other side in the length direction of the upper table receives the monitoring beam. The method further includes detecting presence or absence of beam shielding of the monitoring beam so as to detect presence or absence of a workpiece, by determining whether or not the acquired received beam amount of the beam receiver is lower than a determination threshold for detecting the presence of beam shielding of the monitoring beam. A detection sensitivity of the presence or absence of beam shielding of the monitoring beam is switched from a normal sensitivity mode to a high sensitivity mode when bending by the press brake is initial processing based on a predetermined processing program, and a height position of the beam receiver is lower than a predetermined height position that is a position immediately above a height position of an upper surface of the workpiece set in the predetermined processing program.

BRIEF DESCRIPTION OF DRAWINGS

FIG. 8C is a flowchart showing the operation of the press brake according to the embodiment of the present invention.

DESCRIPTION OF EMBODIMENT

Figure 1:
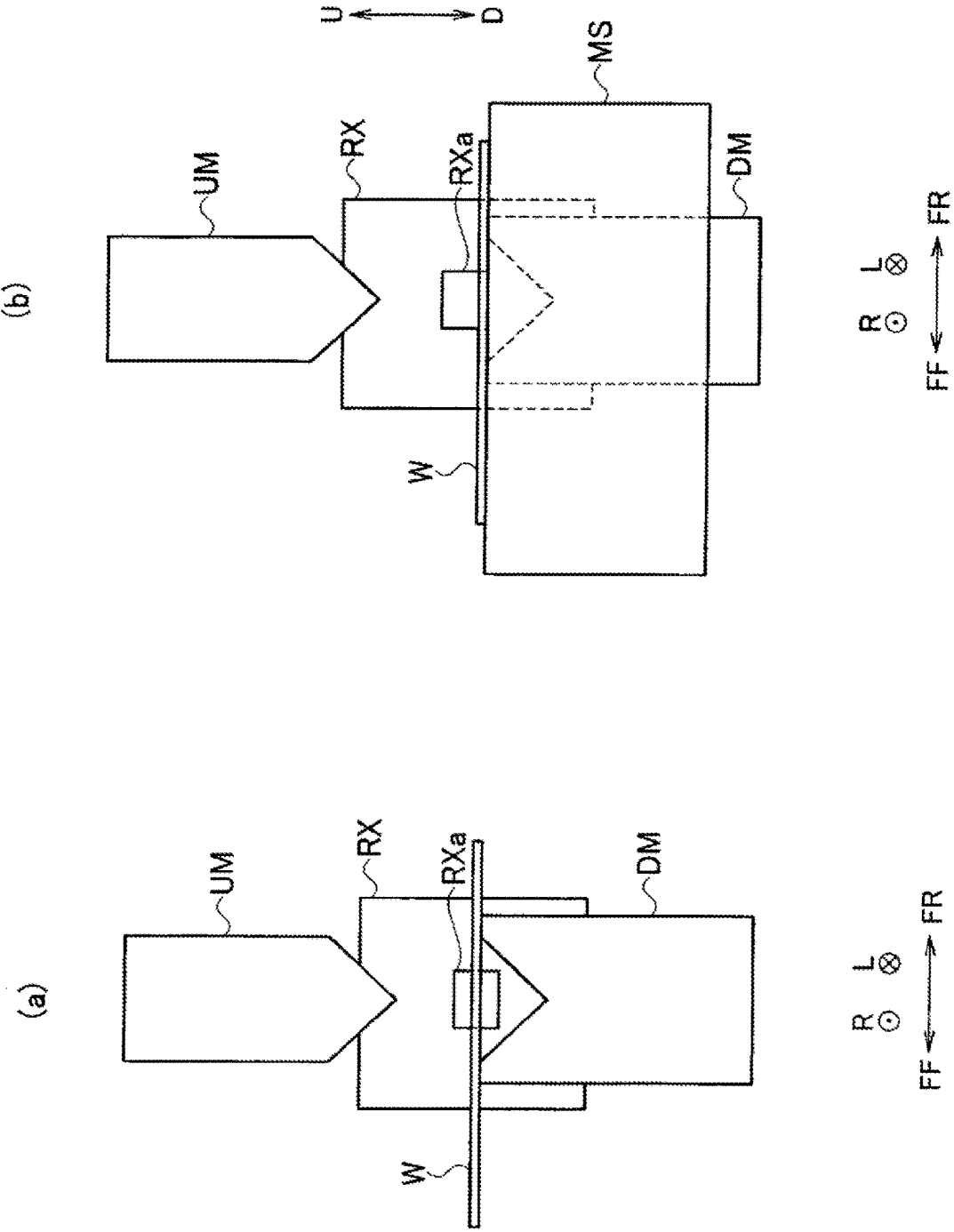
FIGS. 1(a) and 1(b) are schematic diagrams for describing the problem of the present invention.

An embodiment of the present invention will be described with reference to FIGS. 2 to 8C.

Note that in the description and the claims of the present application, "provided" is intended to include not only being directly provided but also being indirectly provided through another member. The "foreign matter" is an object other than the workpiece, such as a finger of an operator or a tool. The "length direction" is the length direction of the press brake, and in the embodiment of the present invention, it is a lateral direction. The "one side in the length direction" is the one side in the length direction of the press brake, and in the embodiment of the present invention, it is a right side. The "other side in the length direction" is the other side in the length direction of the press brake, and in the embodiment of the present invention, it is a left side. The "depth direction" is the depth direction of the press brake, and in the embodiment of the present invention, it is a longitudinal direction. In the drawings, "FF" indicates a forward direction, "FR" indicates a rear direction, "L" indicates a left direction, "R" indicates a right direction, "U" indicates an upward direction, and "D" indicates a downward direction.

Figure 2:
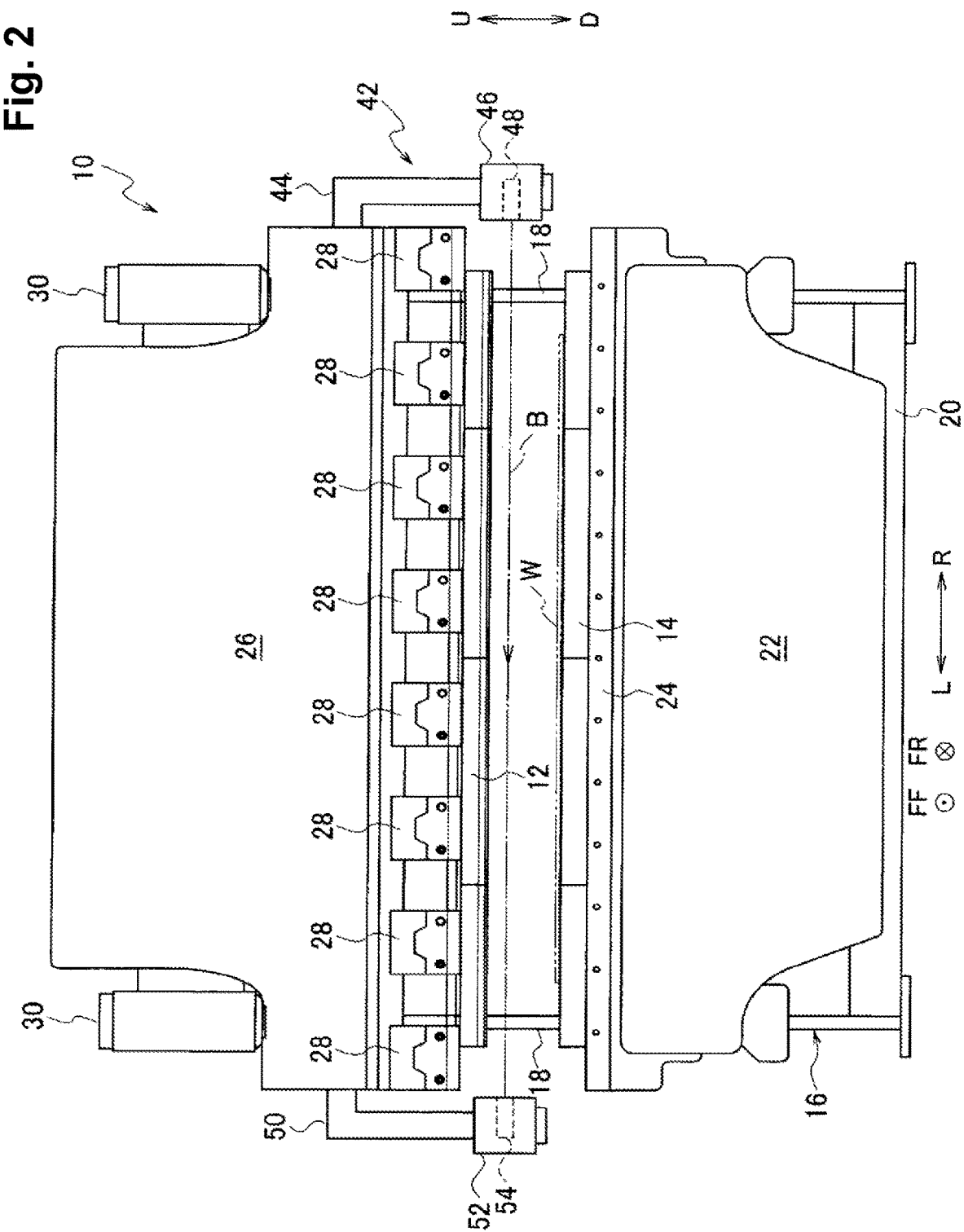
FIG. 2 is a schematic front view of the press brake according to an embodiment of the present invention.
Figure 3:
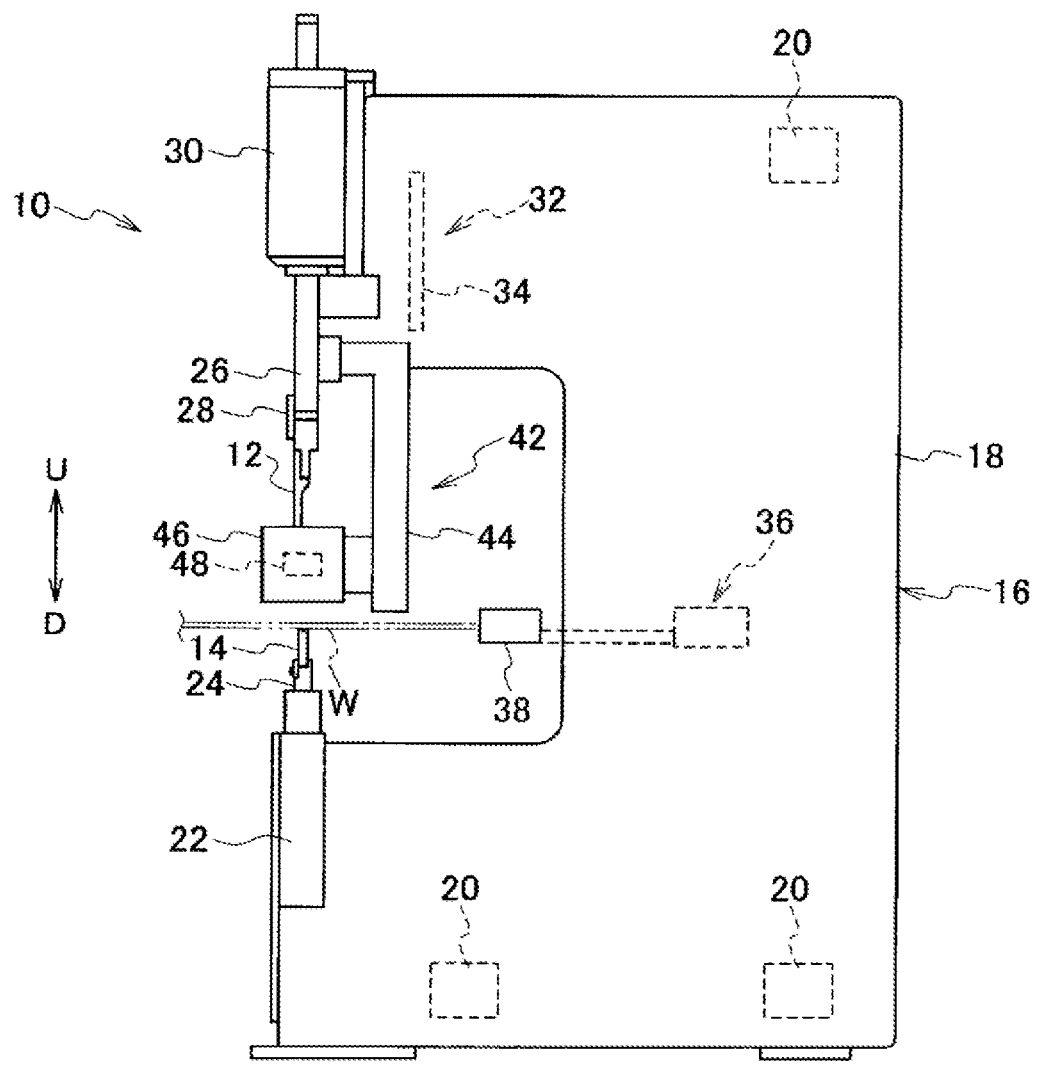
FIG. 3 is a schematic right side view of the press brake according to the embodiment of the present invention.

As shown in FIGS. 2 and 3, a press brake 10 according to the embodiment of the present invention is a processing machine that bends a plate-shaped workpiece (a sheet metal) W by cooperation of an upper tool 12 and a lower tool 14. In addition, the press brake 10 is provided with a main body frame 16, and the main body frame 16 has a pair of side plates 18 facing each other with a space in the length direction (the lateral direction) and a plurality of connecting members 20 that connect the pair of side plates 18.

A lower table 22 extending in the length direction is provided on a lower part of the main body frame 16. A lower tool holder 24 that detachably holds the lower tool 14 is provided on an upper side of the lower table 22. An upper table 26 extending in the length direction is provided on an upper part of the main body frame 16 to be able to move up and down (movable in the vertical direction), and the upper table 26 faces the lower table 22 in the vertical direction. A plurality of upper tool holders 28 that detachably hold the upper tool 12 are provided on the lower side of the upper table 26. Further, on the upper part of each side plate 18, a hydraulic elevating cylinder 30 is provided as an elevating actuator for elevating and lowering the upper table 26.

Note that instead of configuring the upper table 26 to be able to move up and down, the lower table 22 may be configured to be able to move up and down. Instead of using the hydraulic elevating cylinder 30 as the elevating actuator, an elevating servomotor (not shown) may be used.

The press brake 10 is provided with a linear encoder 32 as a detector that detects a height position of the upper table 26. The linear encoder 32 has a linear scale 34 provided on the side plate 18 of one side and extending in the vertical direction, and a read head (not shown) provided at an appropriate position on the upper table 26 and reading a scale of the linear scale 34. In addition, a back gauge 36 for positioning the workpiece W in the depth direction (the longitudinal direction) with respect to the lower tool 14 is provided on the back side (the rear side) of the lower table 22. The back gauge 36 has an abutting member 38 capable of abutting an end surface of the workpiece W, and the abutting member 38 is positionally adjustable in the depth direction. Note that as the detector, a rotary encoder (not shown) may be used instead of using the linear encoder 32.

Figure 4:
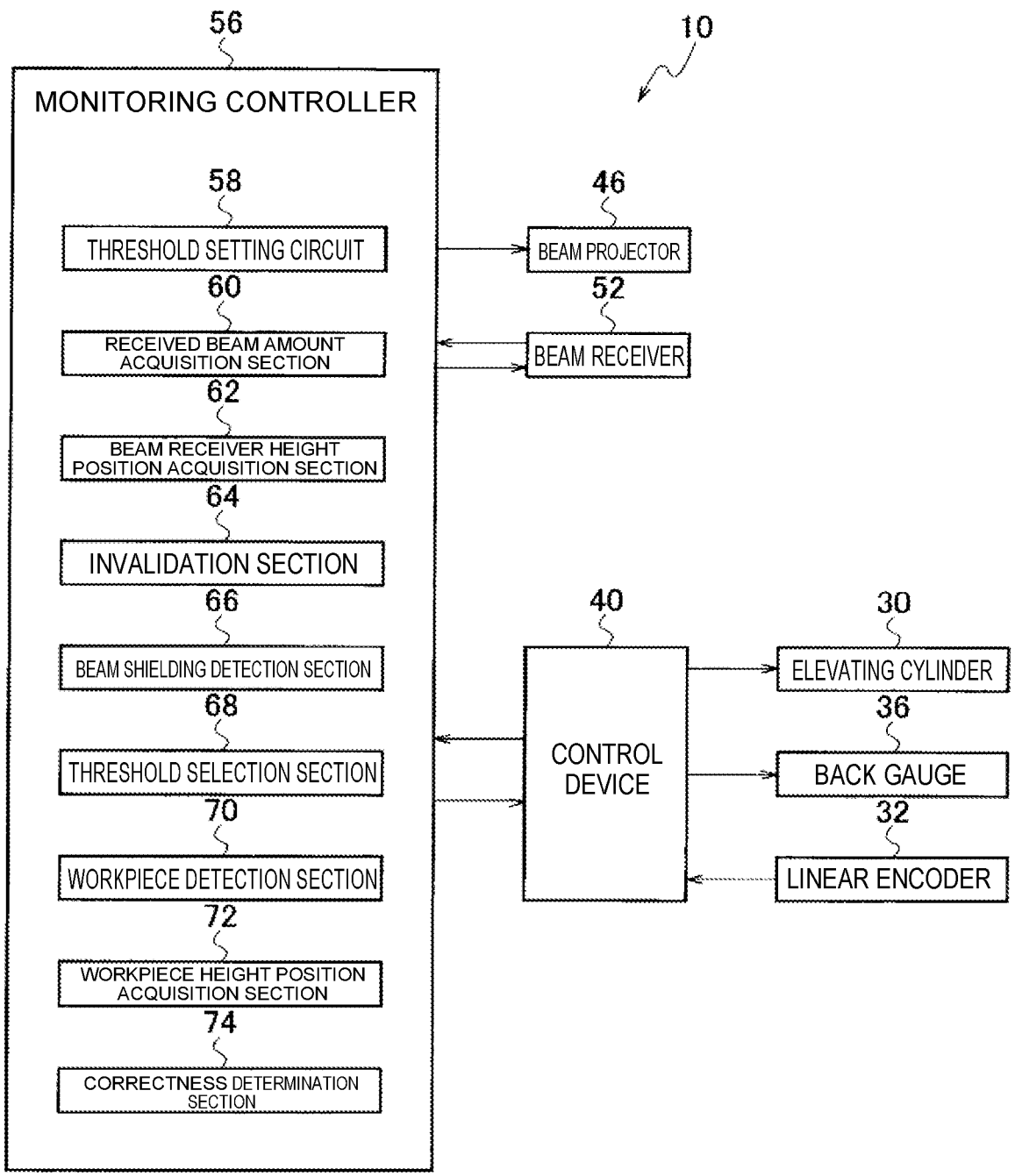
FIG. 4 is a control block diagram of the press brake according to the embodiment of the present invention.

As shown in FIG. 4, the press brake 10 is provided with a control device (an NC device) 40 that controls the pair of elevating cylinders 30, the back gauge 36, and the like based on a processing program. The control device 40 comprises a computer, and the linear encoder 32 and the like are connected to the control device 40. The control device 40 has a memory (not shown) that stores the processing program, tool information, workpiece information, product information, and the like, and a CPU (not shown) that interprets and executes the processing program. The tool information includes information indicating the shape of the upper tool 12 and the dimensions of each part thereof, the shape of the lower tool 14 and the dimensions of each part thereof, and the like. The workpiece information includes information indicating the material and the shape of the workpiece W, the dimensions of each part thereof, and the like. The product information includes information indicating the shape of a product (not shown), the dimension of each part thereof, and the like.

The press brake 10 is provided with an optical safety device 42 that monitors entry of foreign matter other than the workpiece W between the upper tool 12 and the lower tool 14. Then, the specific configuration of the optical safety device 42 will be described hereinafter.

As shown in FIG. 2, a first support member 44 is provided on one side (the right side) in the length direction of the upper table 26. The first support member 44 is provided with a beam projector 46 that projects a laser beam as a monitoring beam B passing through an area and surroundings immediately below the upper tool 12 toward the other side in the length direction (the left direction) of the upper table 26. In other words, the beam projector 46 is provided on the one side in the length direction of the upper table 26 via the first support member 44. In addition, the beam projector 46 has a laser diode as a beam emitting element 48 that emits the laser beam as the monitoring beam B. The height position of the beam projector 46 relative to the upper table 26 is adjustable corresponding to the height of the upper tool 12.

A second support member 50 is provided on the other side (the left side) in the length direction of the upper table 26. The second support member 50 is provided with a beam receiver 52 that receives the laser beam as the monitoring beam B. In other words, the beam receiver 52 is provided on the other side in the length direction of the upper table 26 via the second support member 50. The beam receiver 52 is provided on the second support member 50 via the second support member 50. In addition, the beam receiver 52 has a photodiode as a beam receiving element 54 that outputs a beam receiving voltage (a voltage signal) corresponding to a received beam amount of the monitoring beam (the laser beam) B. The height position of the beam receiver 52 relative to the upper table 26 is adjustable corresponding to the height of the upper tool 12.

Note that a mask (not shown) having a plurality of openings may be arranged on the front side of the beam emitting element 48 to provide a plurality of the monitoring beams B. In this case, a plurality of the beam receiving elements 54 are provided. In addition, the monitoring beam B can be any parallel beam, and an LED beam may be used as the monitoring beam B instead of the laser beam. In this case, as the beam emitting element 48, a light emitting diode is used instead of the laser diode.

Figure 5:
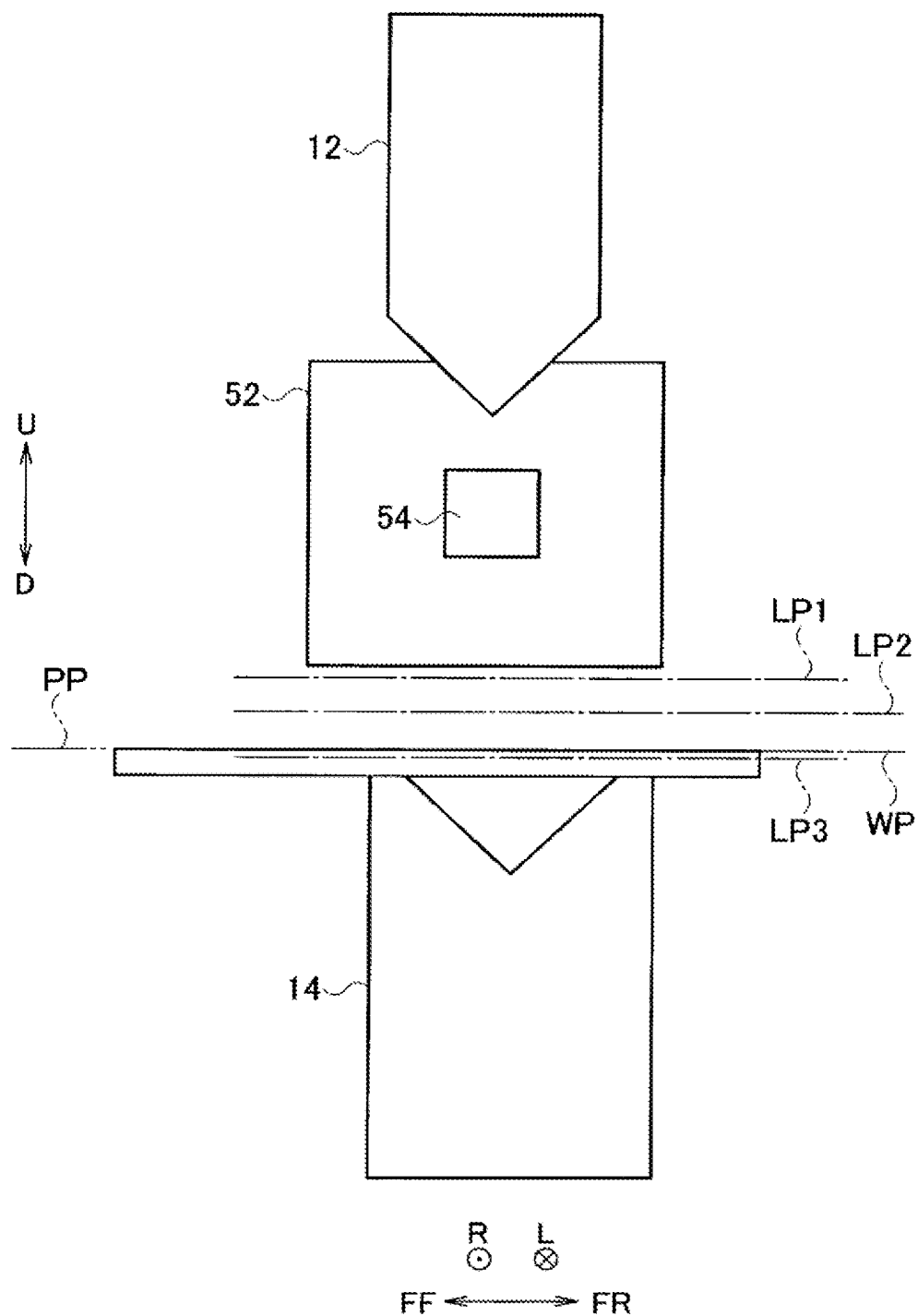
FIG. 5 is a schematic diagram for describing the height position of the upper surface of the workpiece set in the processing program, the actual height position of the upper surface of the workpiece, the predetermined first height position, the predetermined second height position, and the predetermined third height position.
Figure 6:
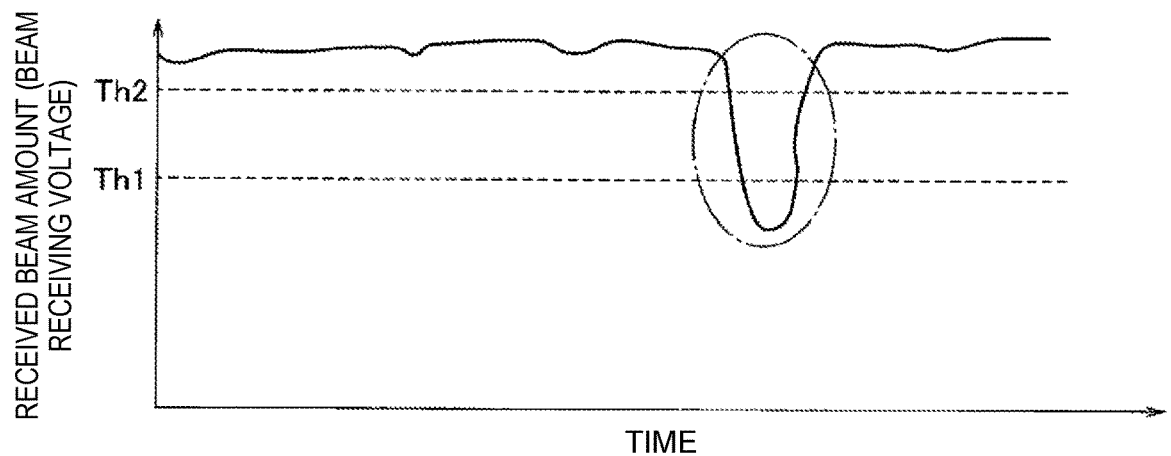
FIG. 6(a) is a diagram showing a state of the received beam amount of the beam receiver being lower than the normal sensitivity threshold as the determination threshold with the detection sensitivity of the beam shielding detection section switched to the normal sensitivity mode.
FIG. 6(b) is a diagram showing a state of the received beam amount of the beam receiver being lower than the high sensitivity threshold as the determination threshold with the detection sensitivity of the beam shielding detection section switched to the high sensitivity mode.
Figure 6:
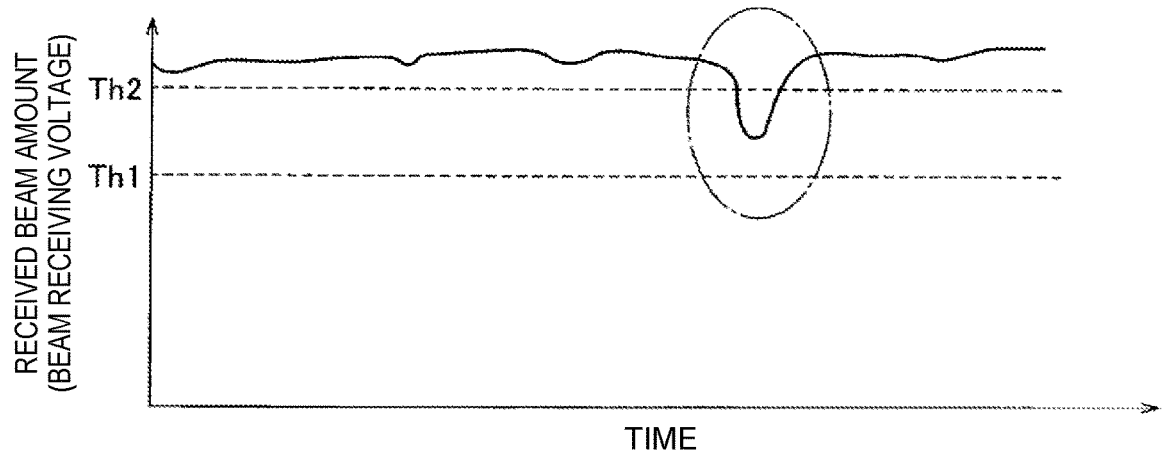
Figure 7:
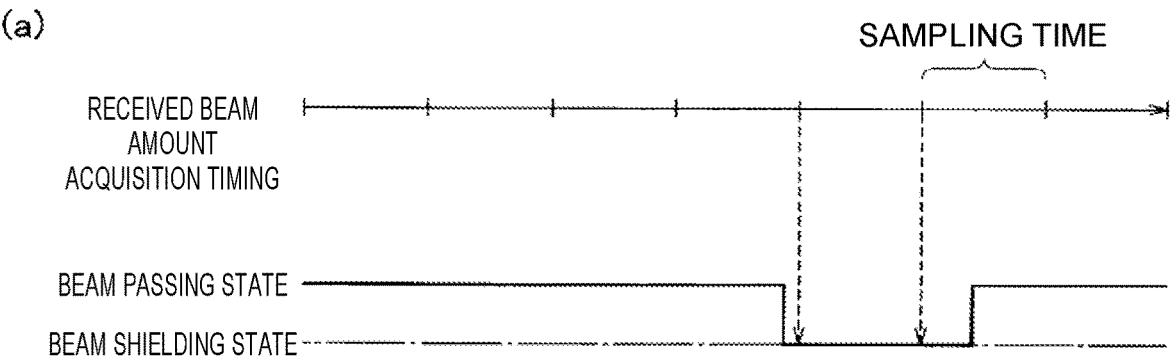
FIG. 7(a) is a diagram showing a state in which the received beam amount of the beam receiver is determined continuously twice as being lower than the determination threshold with the detection sensitivity of the beam shielding detection section switched to the high sensitivity mode.
FIG. 7(b) is a diagram showing a state in which the received beam amount of the beam receiver is determined once as being lower than the determination threshold with the detection sensitivity of the beam shielding detection section switched to the high sensitivity mode.
Figure 7:
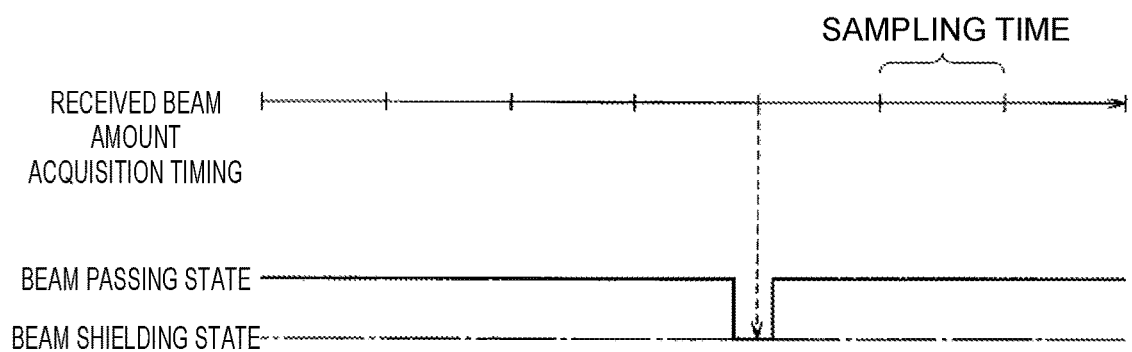

As shown in FIGS. 4 and 5, a monitoring controller 56 for monitoring entry of foreign matter other than the workpiece W between the upper tool 12 and the lower tool 14 is provided at an appropriate position on the side of the beam receiving element 54. The monitoring controller 56 comprises a computer, and the beam projector 46, the beam receiver 52, the control device 40, and the like are connected to the monitoring controller 56. In addition, the monitoring controller 56 has a memory (not shown) that stores a monitoring program and the like, and a CPU (not shown) that interprets and executes the monitoring program. The CPU of the monitoring controller 56 acquires a detection result of the linear encoder 32 from the control device 40 at certain sampling time intervals. The CPU of the monitoring controller 56 acquires, from the control device 40, a height position PP of an upper surface of the workpiece W set in the processing program (hereinafter, appropriately referred to the height position of the upper surface of the workpiece W in the processing program).

As shown in FIG. 4 and FIGS. 6(a) and 6(b), the monitoring controller 56 has a threshold setting circuit as a threshold setting section that sets a normal sensitivity threshold Th1 and a high sensitivity threshold Th2. The normal sensitivity threshold Th1 is a threshold (a threshold voltage) for detecting presence of beam shielding of the monitoring beam B. The high sensitivity threshold Th2 is a threshold (a threshold voltage), which is higher than the normal sensitivity threshold, for detecting the presence of beam shielding of the monitoring beam.

The CPU of the monitoring controller 56 has functions as a received beam amount acquisition section 60, a beam receiver height position acquisition section 62, an invalidation section 64, a beam shielding detection section 66, a threshold selection section 68, a workpiece detection section 70, a workpiece height position acquisition section 72, and a correctness determination section 74. Then, specific details of the beam receiver height position acquisition section 62, the received beam amount acquisition section 60, the invalidation section 64, the beam shielding detection section 66, the threshold selection section 68, the workpiece detection section 70, the workpiece height position acquisition section 72, and the correctness determination section 74 will be described hereinafter.

As shown in Figures from 4 to 6(a) and 6(b), the received beam amount acquisition section 60 acquires a received beam amount per unit time of the beam receiver 52 (a beam receiving voltage of the beam receiver 52) at certain sampling time intervals. In addition, the beam receiver height position acquisition section 62 acquires the height position of the beam receiver 52 (the beam receiving element 54) by arithmetics at certain sampling time intervals based on a detection result of the linear encoder 32 acquired from the control device 40. The height position of the beam receiver 52 corresponds to the height position of the monitoring beam B.

The invalidation section 64 invalidates the monitoring of the optical safety device 42 when the bending by the press brake 10 is second or subsequent processing based on the predetermined processing program and the acquired height position of the beam receiver 52 is lower than a predetermined first height position LP1. The predetermined first height position LP1 is a position immediately above the height position PP of the upper surface of the workpiece W in the processing program.

The beam shielding detection section 66 detects the presence or absence of beam shielding of the monitoring beam B by determining whether or not the acquired received beam amount per unit time of the beam receiver is lower than a determination threshold Th for detecting the presence of beam shielding of the monitoring beam B. Specifically, when the received beam amount per unit time of the beam receiver 52 is lower than the determination threshold Th, the beam shielding detection section 66 detects the presence of beam shielding of the monitoring beam B. When the received beam amount per unit time of the beam receiver 52 is not lower than the determination threshold Th, the beam shielding detection section 66 detects the absence of beam shielding of the monitoring beam B. In addition, the threshold selection section 68 selects either the set normal sensitivity threshold (the threshold voltage) Th1 or the set high sensitivity threshold (the threshold voltage) Th2 as the determination threshold Th.

As shown in FIGS. 4, 6(a) and 6(b), and 7(a) and 7(b), the detection sensitivity of the beam shielding detection section 66 is configured to be switchable between a normal sensitivity mode and a high sensitivity mode. The normal sensitivity mode is a mode in which the normal sensitivity threshold Th1 is selected as the determination threshold Th, and the presence of beam shielding of the monitoring beam B is detected when the received beam amount per unit time of the beam receiver 52 is determined continuously twice as being lower than the determination threshold Th (Th1). The high sensitivity mode is a mode in which the high sensitivity threshold Th2 is selected as the determination threshold Th, and the presence of beam shielding of the monitoring beam B is detected when the received beam amount per unit time of the beam receiver 52 is determined once as being lower than the determination threshold Th (Th2). Note that the frequency of continuous determination in the normal sensitivity mode may be any plurality of times other than twice. In addition, the frequency of determination in the high sensitivity mode is not limited to once, and may be any frequency as long as it is less than the frequency of the continuous determination in the normal sensitivity mode.

As shown in FIGS. 4 and 5, the threshold selection section 68 selects the high sensitivity threshold Th2 as the determination threshold Th when the bending by the press brake 10 is initial processing based on the predetermined processing program and the acquired height position of the beam receiver 52 (the beam receiving element 54) is lower than a predetermined second height position LP2. In other words, in the above case, the CPU of the monitoring controller 56 switches the detection sensitivity of the beam shielding detection section 66 from the normal sensitivity mode to the high sensitivity mode. Further, in other words, in the above case, the detection sensitivity of the beam shielding detection section 66 is configured to be switched from the normal sensitivity mode to the high sensitivity mode. Here, the predetermined second height position LP2 is a position immediately above the height position PP of the upper surface of the workpiece W in the processing program, and is a height position lower than the predetermined first height position LP1. Note that the predetermined second height position LP2 may be set to the same height position as the predetermined first height position LP1 or to a height position higher than the predetermined first height position LP1.

The workpiece detection section 70 detects the presence or absence of the workpiece W on the lower tool 14 based on the detection result from the beam shielding detection section 66 in a state in which the detection sensitivity of the beam shielding detection section 66 is switched to the high sensitivity mode. Specifically, the workpiece detection section 70 detects the presence of the workpiece W on the lower tool 14 when the presence of beam shielding of the monitoring beam B is detected in a state in which the detection sensitivity of the beam shielding detection section 66 is switched to the high sensitivity mode. The workpiece detection section 70 detects the absence of the workpiece on the lower tool 14 when the height position of the beam receiver 52 is lower than a predetermined third height position LP3 at the time of detecting the absence of beam shielding of the monitoring beam B in a state in which the detection sensitivity of the beam shielding detection section 66 is switched to the high sensitivity mode. Here, the predetermined third height position LP3 is a position immediately below the height position PP of the upper surface of the workpiece W in the processing program.

The CPU of the monitoring controller 56 switches the detection sensitivity of the beam shielding detection section 66 from the high sensitivity mode to the normal sensitivity mode when the bending by the press brake 10 is initial processing based on the predetermined processing program and the presence or the absence of the workpiece on the lower tool 14 is detected. In other words, the detection sensitivity of the beam shielding detection section 66 is configured to be switched from the high sensitivity mode to the normal sensitivity mode in the above case.

The workpiece height position acquisition section 72 acquires an actual height position WP of the upper surface of the workpiece W by arithmetics based on the height position of the beam receiver 52 at the time of detecting the presence of the workpiece on the lower tool 14. In addition, the correctness determination section 74 determines whether or not the acquired actual height position WP of the upper surface of the workpiece W is correct as compared with the height position PP of the upper surface of the workpiece W in the processing program. Specifically, when the actual height position WP of the upper surface of the workpiece W is within an allowable range of the height position PP of the upper surface of the workpiece W in the processing program, the correctness determination section 74 determines that the actual height position WP of the upper surface of the workpiece W is correct. When the actual height position WP of the upper surface of the workpiece W exceeds the allowable range of the height position PP of the upper surface of the workpiece W in the processing program, the correctness determination section 74 determines that the actual height position PP of the upper surface of the workpiece W is not correct.

Subsequently, the effect of the embodiment of the present invention including a workpiece detection method according to the embodiment of the present invention will be described with reference to FIGS. 8A, 8B, 8C, and the like. The workpiece detection method according to the embodiment of the present invention is a method for performing detection of the presence or absence of the workpiece W on the lower tool 14 and correctness determination of the actual height position of the upper surface of the workpiece W. The workpiece detection method according to the embodiment of the present invention includes a step of acquiring a received beam amount, a step of detecting beam shielding, a step of detecting a workpiece, and step of determining correctness.

The operator turns on the power of the press brake 10 and presses a start button (not shown) to operate. Then, the monitoring beam B is projected from the beam projector 46 toward an area and surroundings immediately below the upper tool 12, and the beam receiver 52 receives the monitoring beam B. Next, after confirming that the received beam amount per unit time of the beam receiver 52 (the beam receiving voltage of the beam receiving element 54) is equal to or more than a predetermined received beam amount, the CPU of the monitoring controller 56 turns on a safety signal (step S101 in FIG. 8A). In addition, the CPU of the monitoring controller 56 acquires the height position PP of the upper surface of the workpiece W in the processing program from the control device 40 (step S102 in FIG. 8A). Then, the control device 40 controls the pair of elevating cylinders 30 to lower the upper table 26 and starts a bending operation (step S103 in FIG. 8A).

Figure 8A:
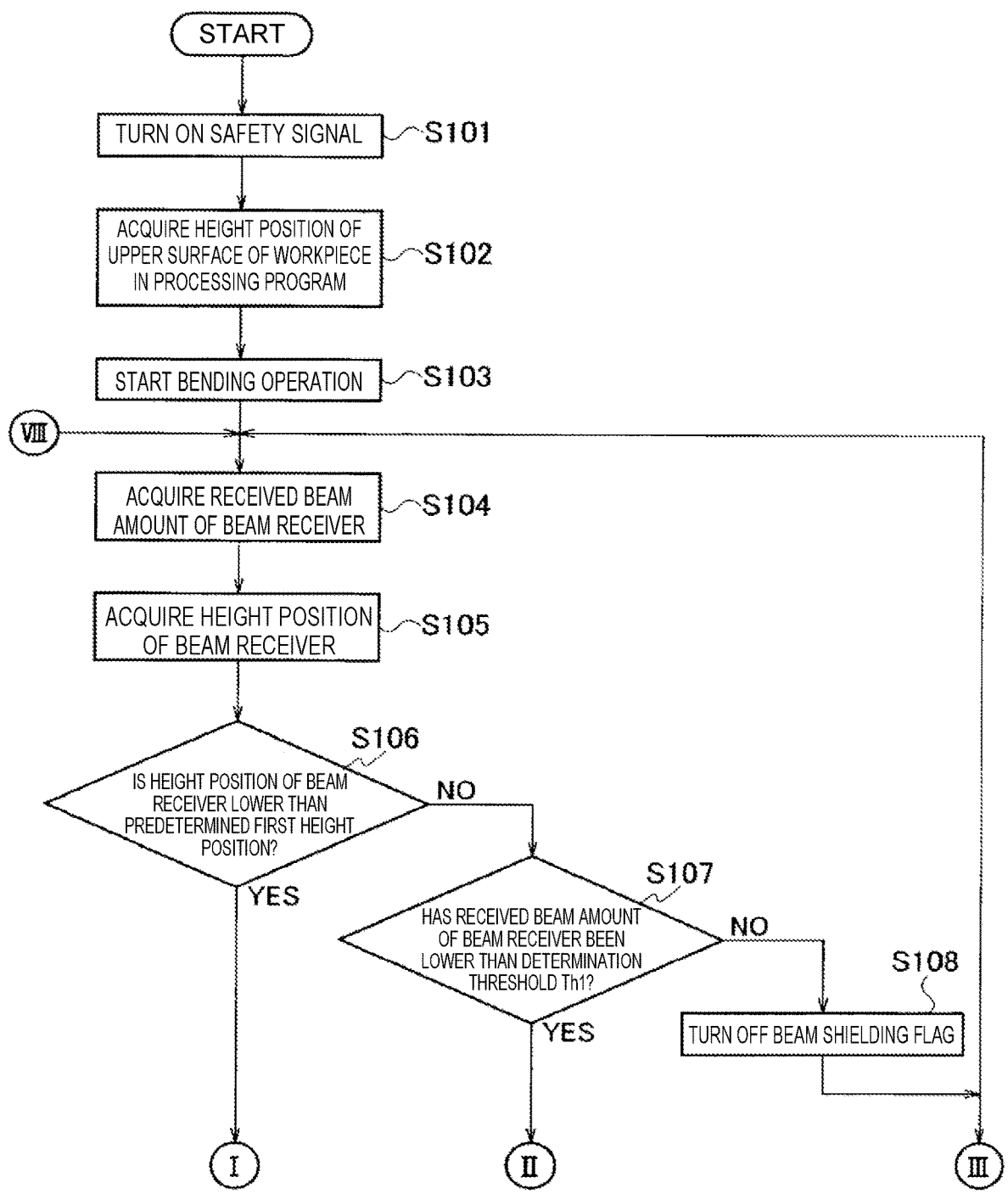
FIG. 8A is a flowchart showing the operation of the press brake according to the embodiment of the present invention.

Thereafter, the received beam amount acquisition section 60 acquires the received beam amount per unit time of the beam receiver 52 at certain sampling time intervals (step S104 in FIG. 8A). In addition, the beam receiver height position acquisition section 62 acquires the height position of the beam receiver 52 by arithmetics at certain sampling time intervals based on the detection result of the linear encoder 32 acquired from the control device 40 (step S105 in FIG. 8A, the step of acquiring a received beam amount). Then, the CPU of the monitoring controller 56 determines whether or not the height position of the beam receiver 52 is lower than the predetermined first height position LP1 (step S106 in FIG. 8A).

If the height position of the beam receiver 52 is not lower than the predetermined first height position LP1, that is, in the case of No in step S106 in FIG. 8A, the beam shielding detection section 66 determines whether or not the received beam amount per unit time of the beam receiver is lower than the determination threshold Th (Th1) (step S107 in FIG. 8A). If the received beam amount per unit time of the beam receiver is not lower than the determination threshold Th (Th1), that is, in the case of No in step 107 in FIG. 8A, the beam shielding detection section 66 detects the absence of beam shielding. Then, the CPU of the monitoring controller 56 turns off a beam shielding flag (step S108 in FIG. 8A) and returns the processing to step S104 in FIG. 8A.

If the received beam amount per unit time of the beam receiver is lower than the determination threshold Th (Th1) (in the case of Yes in step S107 in FIG. 8A), the beam shielding detection section 66 determines whether or not the beam shielding flag is on (step S109 in FIG. 8A). If the beam shielding flag is not on, that is, in the case of No in step S109 in FIG. 8B, the CPU of the monitoring controller 56 turns on the beam shielding flag (step S110 in FIG. 8B) and returns the processing to step S104 in FIG. 8A. If the beam shielding flag is on, that is, in the case of Yes in step S109 in FIG. 8B, the beam shielding detection section 66 detects the presence of beam shielding of the monitoring beam B (step S111 in FIG. 8B, the step of detection beam shielding), and the CPU of the monitoring controller 56 turns off the safety signal (step S112 in FIG. 8C). Then, the control device 40 controls the pair of elevating cylinders 30 to stop the lowering operation of the upper table 26 (step S113 in FIG. 8B).

Figure 8B:
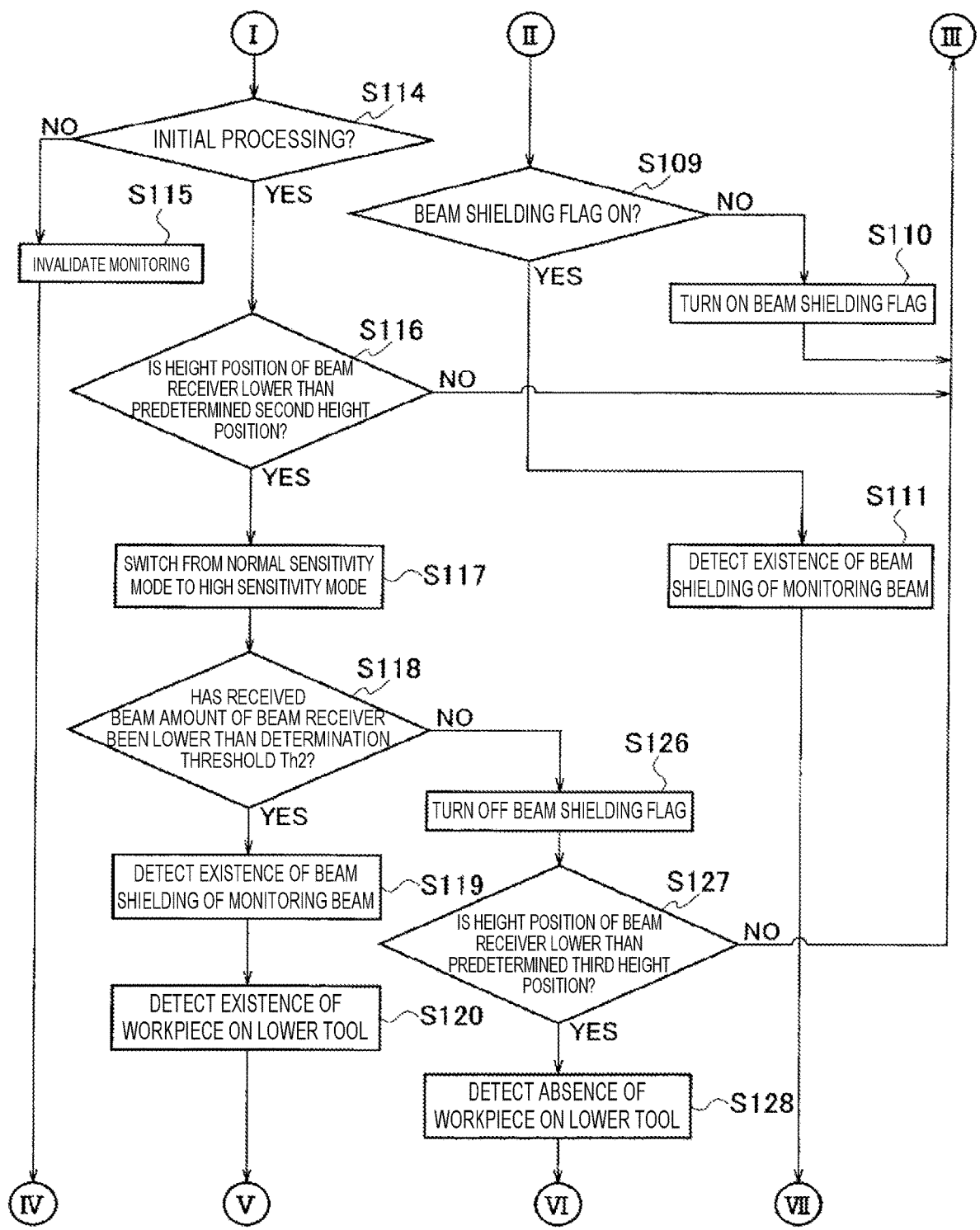
FIG. 8B is a flowchart showing the operation of the press brake according to the embodiment of the present invention.

On the other hand, if the height position of the beam receiver 52 is lower than the predetermined first height position LP1, that is, in the case of Yes in step S106 in FIG. 8A, the CPU of the monitoring controller 56 determines whether or not the bending is initial processing based on the predetermined bending program (step S114 in FIG. 8B). If the bending is second or subsequent processing, that is, in the case of No in step S114 in FIG. 8B, the invalidation section 64 invalidates the monitoring of the optical safety device 42 (step S115 in FIG. 8B). If the bending is initial processing, that is, in the case of Yes in step S114 in FIG. 8A, the CPU of the monitoring controller 56 determines whether or not the height position of the beam receiver 52 is lower than the predetermined second height position LP2 (step S116 in FIG. 8B). If the height position of the beam receiver is not lower than the predetermined second height position LP2, that is, in the case of No in step S116 in FIG. 8B, the CPU of the monitoring controller 56 returns the processing to step S104 in FIG. 8A.

If the height position of the beam receiver 52 is lower than the predetermined second height position LP2, that is, in the case of Yes in step S116 in FIG. 8B, the threshold selection section 68 selects the high sensitivity threshold Th2 as the determination threshold Th. In other words, the CPU of the monitoring controller 56 switches the detection sensitivity of the beam shielding detection section 66 (the detection sensitivity of the presence or absence of beam shielding of the monitoring beam B) from the normal sensitivity mode to the high sensitivity mode (step S117 in FIG. 8B). Then, the beam shielding detection section 66 determines whether or not the received beam amount per unit time of the beam receiver is lower than the determination threshold Th (Th2) (step S118 in FIG. 8C).

If the received beam amount per unit time of the beam receiver is lower than the determination threshold Th (Th2), that is, in the case of Yes in step S118 in FIG. 8B, the beam shielding detection section 66 detects the presence of beam shielding of the monitoring beam B (step S119 in FIG. 8B, the step of detecting beam shielding). Then, the workpiece detection section 70 detects the presence of the workpiece W on the lower tool 14 (step S120 in FIG. 8B, the step of detecting a workpiece), and the CPU of the monitoring controller 56 switches the detection sensitivity of the beam shielding detection section 66 from the high sensitivity mode to the normal sensitivity mode (step S121 in FIG. 8C).

Thereafter, the workpiece height position acquisition section 72 acquires, by arithmetics, the actual height position WP of the upper surface of the workpiece W based on the height position of the beam receiver 52 at the time of detecting the presence of the workpiece on the lower tool 14 (step S122 in FIG. 8C). Then, the correctness determination section 74 determines whether or not the actual height position WP of the upper surface of the workpiece W is within the allowable range of the height position PP of the upper surface of the workpiece W in the processing program (step S123 in FIG. 8C, the step of determining correctness). If the actual height position WP of the upper surface of the workpiece W is within the allowable range of the height position PP of the upper surface of the workpiece W in the processing program, that is, in the case of Yes in step S123 in FIG. 8C, the correctness determination section 74 determines that the actual height position WP of the upper surface of the workpiece W is correct (step S124 in FIG. 8C).

If the actual height position WP of the upper surface of the workpiece W is not within the allowable range of the height position PP of the upper surface of the workpiece W in the processing program, that is, in the case of No in step S123 in FIG. 8C, the correctness determination section 74 determines that the actual height position WP of the upper surface of the workpiece W is not correct (step S125 in FIG. 8C). Then, the CPU of the monitoring controller 56 turns off the safety signal (step S112 in FIG. 8C), and the control device 40 controls the pair of elevating cylinders 30 to stop the lowering operation of the upper table 26 (step S113 in FIG. 8C).

On the other hand, if the received beam amount per unit time of the beam receiver is not lower than the determination threshold Th (Th2), that is, in the case of No in step S118 in FIG. 8B, the beam shielding detection section 66 detects the absence of beam shielding. Then, the CPU of the monitoring controller 56 turns off the beam shielding flag (step S126 in FIG. 8B) and determines whether or not the height position of the beam receiver 52 is lower than the predetermined third height position LP3 (step S127 in FIG. 8B).

If the height position of the beam receiver 52 is lower than the predetermined first height position LP3, that is, in the case of Yes in step S127 in FIG. 8B, the workpiece detection section 70 detects the absence of the workpiece on the lower tool 14 (step S128 in FIG. 8B). Then, the CPU of the monitoring controller 56 switches the detection sensitivity of the beam shielding detection section 66 from the high sensitivity mode to the normal sensitivity mode (step S121 in FIG. 8C). Then, the CPU of the monitoring controller 56 turns off the safety signal (step S112 in FIG. 8C), and the control device 40 controls the pair of elevating cylinders 30 to stop the lowering operation of the upper table 26 (step S113 in FIG. 8C). If the height position of the beam receiver is not lower than the predetermined first height position LP3 (in the case of No in step S126 in FIG. 8B), the CPU of the monitoring controller 56 returns the processing to step S104 in FIG. 8A.

After determining that the actual height position WP of the upper surface of the workpiece W is correct or after invalidating the monitoring of the optical safety device 42, the CPU of the monitoring controller 56 determines whether or not the bending operation is completed (step S130 in FIG. 8C). Then, if the bending operation is completed, that is, in the case of Yes in step S130 in FIG. 8C, the CPU or the like of the monitoring controller 56 ends the series of processes. If the bending operation has not been completed, that is, in the case of No in step S130 in FIG. 8C, the CPU of the monitoring controller 56 returns the processing to step S104 in FIG. 8A.

As described above, the detection sensitivity of the beam shielding detection section 66 (the detection sensitivity of the presence or absence of beam shielding of the monitoring beam B) is configured to be switched from the normal sensitivity mode to the high sensitivity mode when the bending is initial processing based on the predetermined processing program and the height position of the beam receiver 52 is lower than the predetermined second height position PL2. As a result, even if the thickness of the workpiece W is significantly thin, it is possible to reliably detect the presence or absence of beam shielding of the monitoring beam B without using the magnet sheet MS (see FIG. 1(b)). Then, it is possible to reliably perform the detection of the presence or absence of the workpiece W on the lower tool 14 and the correctness determination work of the actual height position WP of the upper surface of the workpiece W.

Therefore, according to the embodiment of the present invention, it is possible to eliminate the step of attaching a magnet sheet to a side surface of the lower tool 14 before performing initial processing based on the predetermined processing program. As a result, according to the embodiment of the present invention, it is possible to reduce the workload of the bending operation and improve efficiency in the bending operation.

Note that the present invention is not limited to the description of the above embodiment, and can be implemented in the following modes, for example.

If the sampling interval of the received beam amount acquisition section 60 is fast enough to prevent omission of detection of the thin plate-shaped workpiece W, only the high sensitivity threshold Th2 may be used as the determination threshold Th. In this case, the normal sensitivity mode is a mode in which the presence of beam shielding of the monitoring beam B is detected when the received beam amount per unit time of the beam receiver 52 is determined continuously for a plurality of times as being lower than the determination threshold Th (Th2). The high sensitivity mode is a mode in which the presence of beam shielding of the monitoring beam B is detected when the received beam amount per unit time of the beam receiver 52 is determined as being lower than the determination threshold Th (Th2), for a fewer times than a number of times of the continuous determination in the normal sensitivity mode.

If the sampling interval of the received beam amount acquisition section 60 is fast enough to prevent omission of detection of the thin plate-shaped workpiece W, the beam shielding of the monitoring beam B may be detected when the received beam amount per unit time of the beam receiver 52 is determined continuously for predetermined times as being lower than the determination threshold Th. In this case, the normal sensitivity mode is a mode in which the normal sensitivity threshold Th1 is selected as the determination threshold Th. The high sensitivity mode is a mode in which the high sensitivity threshold Th2 is selected as the determination threshold Th.

Further, the scope of rights encompassed by the present invention is not limited to the above embodiment.

According to the technical aspect of the present invention, the detection sensitivity of the beam shielding detection section is configured to be switched from the normal sensitivity. mode to the high sensitivity mode when the bending is initial processing based on the predetermined processing program and the height position of the beam receiver is lower than the predetermined height position. As a result, even if the thickness of the workpiece is significantly thin, it is possible to reliably detect the presence or absence of beam shielding of the monitoring beam without using a magnet sheet. Then, it is possible to reliably perform the detection of the presence or absence of a workpiece on the lower tool and the correctness determination of the actual height position of the upper surface of the workpiece.

According to the present invention, it is possible to eliminate the step of attaching a magnet sheet on a side surface of the lower tool before performing initial processing based on a predetermined processing program. As a result, according to the present invention, it is possible to reduce the workload of the bending operation and improve efficiency in the bending operation.

UNITED STATES DESIGNATION

In connection with United States designation, the present international patent application claims the benefit of priority under 35 U.S.C. 119(a) to Japanese Patent Application No. 2018-240502 filed on Dec. 25, 2018 whose disclosed contents are cited herein.

REFERENCE SIGNS LIST

10 Press brake
12 Upper tool

14 Lower tool
16 Main body frame
18 Side plate
20 Connecting member
22 Lower table
24 Lower tool holder
26 Upper table
28 Upper tool holder
30 Elevating cylinder (elevating actuator)
32 Linear encoder
34 Linear scale
36 Back gauge
38 Abutting member
40 Control device (NC device)
42 Optical safety device
44 First support member
46 Beam projector
48 Beam emitting element
50 Second support member
52 Beam receiver
54 Beam receiving element
56 Monitoring controller
58 Threshold setting circuit (threshold setting section)
60 Received beam amount acquisition section
62 Beam receiver height position acquisition section
64 Invalidation section
66 Beam shielding detection section
68 Threshold selection section
70 Workpiece detection section
72 Workpiece height position acquisition section
74 Correctness determination section
B Monitoring beam (laser beam)
UM Upper tool
DM Lower tool
MS Magnet sheet
RX Beam receiver
Rxa Beam receiving element
W Workpiece (sheet metal)

The invention claimed is:

1. An optical safety device for monitoring entry of foreign matter between an upper tool and a lower tool of a press brake, the optical safety device comprising:
   a beam projector provided on one side in a length direction of an upper table of the press brake and configured to project a monitoring beam passing through an area and surroundings immediately below the upper tool toward another side in the length direction of the upper table;
   a beam receiver provided on the other side in the length direction of the upper table and configured to receive the monitoring beam; and
   a monitoring controller comprising:
      a received beam amount acquisition section configured to acquire a received beam amount of the beam receiver at certain sampling time intervals; and
      a beam shielding detection section configured to detect presence or absence of beam shielding of the monitoring beam by determining whether or not the acquired received beam amount of the beam receiver is lower than a determination threshold for detecting the presence of beam shielding of the monitoring beam,
   wherein a detection sensitivity of the beam shielding detection section is configured to be switched from a normal sensitivity mode to a high sensitivity mode when:
      a bending process by use of the press brake is an initial process based on a predetermined processing program, and
      a height position of the beam receiver is lower than a predetermined height position that is a position immediately above a height position of an upper surface of a workpiece set in the predetermined processing program.

2. The optical safety device according to claim 1, wherein the monitoring controller further comprises:
   a threshold setting section configured to set a normal sensitivity threshold for detecting the presence of beam shielding of the monitoring beam and a high sensitivity threshold for detecting the presence of beam shielding of the monitoring beam, the high sensitivity threshold being higher than the normal sensitivity threshold; and
   a threshold selection section configured to select either the set normal sensitivity threshold or the set high sensitivity threshold as the determination threshold,
   wherein the threshold selection section selects the high sensitivity threshold as the determination threshold when:
      the bending process by use of the press brake is the initial process based on a predetermined processing program, and
      a height position of the beam receiver is lower than a predetermined height position that is a position immediately above a height position of an upper surface of a workpiece set in the predetermined processing program.

3. The optical safety device according to claim 1, wherein the normal sensitivity mode is a mode in which the presence of beam shielding of the monitoring beam is detected when the received beam amount of the beam receiver is determined continuously for a plurality of times as being lower than the determination threshold, and
   the high sensitivity mode is a mode in which the presence of beam shielding of the monitoring beam is detected when the received beam amount of the beam receiver is determined as being lower than the determination threshold, for a fewer times than a number of times of the continuous determination in the normal sensitivity mode.

4. The optical safety device according to claim 1, wherein the monitoring controller further comprises a workpiece detection section configured to detect presence or absence of a workpiece on the lower tool based on the detection result from the beam shielding detection section in a state in which the detection sensitivity of the beam shielding detection section is switched to the high sensitivity mode.

5. The optical safety device according to claim 4, wherein the monitoring controller further comprises:
   a workpiece height position acquisition section configured to acquire an actual height position of the upper surface of the workpiece based on the height position of the beam receiver at time of detecting the presence of the workpiece on the lower tool; and
   a correctness determination section configured to determine whether or not the acquired actual height position of the upper surface of the workpiece is correct as compared with the height position of the upper surface of the workpiece set in the predetermined processing program.

6. The optical safety device according to claim 4, wherein the detection sensitivity of the beam shielding detection section is configured to be switched from the high sensitivity mode to the normal sensitivity mode when the presence or absence of the workpiece on the lower tool is detected.

7. A press brake comprising
   an upper table;
   an upper tool;
   a lower tool; and
   an optical safety device for monitoring entry of foreign matter between the upper tool and the lower tool, the optical safety device comprising:
   a beam projector provided on one side in a length direction of the upper table and configured to project a monitoring beam passing through an area and surroundings immediately below the upper tool toward another side in the length direction of the upper table;
   a beam receiver provided on the other side in the length direction of the upper table and configured to receive the monitoring beam; and
   a monitoring controller comprising:
   a received beam amount acquisition section configured to acquire a received beam amount of the beam receiver at certain sampling time intervals; and
   a beam shielding detection section configured to detect presence or absence of beam shielding of the monitoring beam by determining whether or not the acquired received beam amount of the beam receiver is lower than a determination threshold for detecting the presence of beam shielding of the monitoring beam,
   wherein a detection sensitivity of the beam shielding detection section is configured to be switched from a normal sensitivity mode to a high sensitivity mode when:
      a bending process by use of the press brake is an initial process based on a predetermined processing program, and a height position of the beam receiver is lower than a predetermined height position that is a position immediately above a height position of an upper surface of a workpiece set in the predetermined processing program.

8. A workpiece detection method of a press brake system, comprising:
   acquiring a received beam amount of a beam receiver at certain sampling time intervals in a state in which a beam projector provided on one side in a length direction of an upper table of a press brake projects a monitoring beam passing through an area and surroundings immediately below an upper tool toward another side in the length direction of the upper table, and the beam receiver provided on the other side in the length direction of the upper table receives the monitoring beam; and
   detecting presence or absence of beam shielding of the monitoring beam so as to detect presence or absence of a workpiece, by determining whether or not the acquired received beam amount of the beam receiver is lower than a determination threshold for detecting the presence of beam shielding of the monitoring beam,
   wherein a detection sensitivity of the presence or absence of beam shielding of the monitoring beam is switched from a normal sensitivity mode to a high sensitivity mode when:
      a bending process by use of the press brake is an initial process based on a predetermined processing program, and
      a height position of the beam receiver is lower than a predetermined height position that is a position immediately above a height position of an upper surface of the workpiece set in the predetermined processing program.

* * * * *